Dec. 2, 1969 V. M. TRUSOV ET AL 3,482,084

METHOD AND DEVICE FOR OBTAINING VOLTAGE REPRESENTING A PREDETERMINED FUNCTION AND FOR LINEARIZATION OF NONLINEAR OPERATING CHARACTERISTICS OF FREQUENCY-MEASURING TRANSDUCERS ADAPTED TO DETERMINE PHYSICAL VALUES

Filed June 24, 1965 4 Sheets-Sheet 1

Dec. 2, 1969 V. M. TRUSOV ET AL 3,482,084

METHOD AND DEVICE FOR OBTAINING VOLTAGE REPRESENTING A PREDETERMINED FUNCTION AND FOR LINEARIZATION OF NONLINEAR OPERATING CHARACTERISTICS OF FREQUENCY-MEASURING TRANSDUCERS ADAPTED TO DETERMINE PHYSICAL VALUES

Filed June 24, 1965 4 Sheets-Sheet 2

METHOD AND DEVICE FOR OBTAINING VOLTAGE REPRESENTING A PREDETERMINED FUNCTION AND FOR LINEARIZATION OF NONLINEAR OPERATING CHARACTERISTICS OF FREQUENCY-MEASURING TRANSDUCERS ADAPTED TO DETERMINE PHYSICAL VALUES

Filed June 24, 1965

United States Patent Office 3,482,084
Patented Dec. 2, 1969

3,482,084
METHOD AND DEVICE FOR OBTAINING VOLTAGE REPRESENTING A PREDETERMINED FUNCTION AND FOR LINEARIZATION OF NONLINEAR OPERATING CHARACTERISTICS OF FREQUENCY-MEASURING TRANSDUCERS ADAPTED TO DETERMINE PHYSICAL VALUES

Viktor Matveevich Trusov and Anna Pavlovna Fedorova, both of Khlebozayodsky proezd 8, korpus 14, Apt. 59; and Evgeny Mikhailovich Chernetsky, Izmailovsky Boulevard 60/10, Apt. 94, all of Moscow, U.S.S.R.

Filed June 24, 1965, Ser. No. 466,747
Int. Cl. G06f *15/20;* G06g *7/26*
U.S. Cl. 235—150.3 6 Claims

ABSTRACT OF THE DISCLOSURE

An apparatus and method for generating a voltage representative of a function by dividing the constant frequency of a pulse source by a variable division factor which varies according to the said function. The resulting frequency time function is transformed into a digital pulse function, which is changed linearly into a corresponding analog voltage.

The present invention relates to a method of and device for obtaining functional voltages (i.e., voltages which represent functions) and, in particular, to a device for the linearization of the operating characteristics of frequency-measuring transducers characterized by a nonlinear relationship between the parameter being measured and the frequency of the output signal.

Methods of generating functional voltages are known which are based mostly on the use of limiter diodes. The main disadvantages of said methods are their low accuracy and difficulty in obtaining arbitrary functions.

The known devices used for linearization of the operating characteristics of frequency-measuring transducers are based on obtaining the difference between the operating frequency of the transducer and the constant pedestal frequency so selected that the period of the differential frequency depends linearly upon the parameter being measured.

An object of the invention is to provide a method of generating the desired functional voltages by means of digital-to-analog conversion and the functional transformation of voltages with a high degree of accuracy.

It is among the objects of the invention to provide an improved device for generating functional voltages.

It is further among the objects of the invention to provide a functional device for the discrete processing of information, said device ensuring a high frequency stability and a wide readjustment range.

It is still further among the objects of the invention to provide a functional device for the discrete processing of information, said device insuring the linear dependence of the output data in a digital-pulse form upon a parameter being measured.

The method for generating a functional voltage in accordance with the invention, is characterized in that the constant frequency of a pulse generator is divided by means of a pulse counter having a variable division factor which varies as will be shown, the resultant frequency time function corresponding to a desired functional relationship being then converted into a digital-pulse function by integrating the frequency time function by a reversible counter of pulses recurring at a rate varying according to a certain law; the digital-pulse function is then linearly converted into a voltage by means of a digital-to-analog converter.

The device for realization of the proposed method comprises a quartz oscillator whose output frequency serves to fill the cycle intervals of the frequency-measuring transducers; an AND circuit connected to the output of said quartz oscillator; a quartz oscillator frequency divider with a controllable division factor, said divider being connected to the output of said AND circuit. Connected to the outputs of said divider are the input of a decoder-switch and the input of a trigger which controls the operation of said AND circuit, as well as a pulse counter with a converter of digital information into a voltage, connected to the output thereof. The control of said divider, trigger and the output counter is performed by the trigger circuit.

The output pulse counter can be made reversible and can be connected to the output of the decoder-switch.

The quartz oscillator frequency divider can employ AND circuits, a chain of series-connected triggers, one output of each trigger being connected to the input of the next trigger in the chain and the other output being connected to the input of a corresponding AND circuit to provide the anticoincidence in time of pulses repeating at the rate of $f/2^n$, where $f$ is a frequency of the quartz oscillator, $n$ is the serial number of a trigger, said other output of each trigger being also connected to an OR circuit intended to sum up the pulses, at the output of which circuit the frequency time function is obtained.

Furthermore, the proposed invention can be used for the discrete processing of information coming from the non-linear frequency transducers, for which purpose the device is provided with a frequency-measuring transducer, a key circuit connected to the output of said transducer and controlled by the trigger circuit, a circuit to fix the time of measurement, said latter circuit being connected to the output of the key circuit, a supplementary AND circuit connected between the frequency divider and the output counter, and a trigger operating said supplementary AND circuit and connected by one of its inputs to the output of said circuit to fix the time of measurement.

Other objects and advantages of the invention will be more apparent from the following description and the accompanying drawings wherein.

Figure 8:
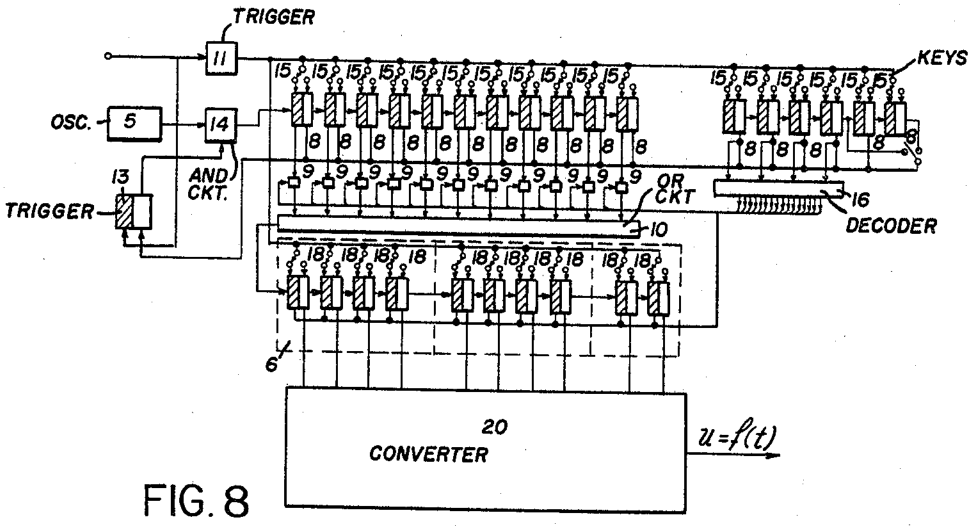

FIGS. 7*a, b, c, d, e* and *f* show time diagrams explaining the operation of the linearization device; and FIG. 8 is a logical circuit of a device enabling a obtaining of the required functional voltages with a high degree of accuracy.

The proposed method and the operation of the device are as follows.

Figure 1:
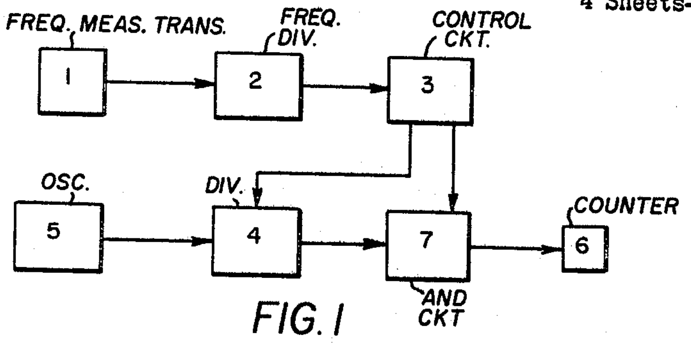
FIG. 1 is a block diagram of a device for linearization of operating characteristics of a frequency-measuring transducer.

Signal $F_1=f(P)$ (where $F_1$ is a frequency of the transducer and P=a parameter being measured) comes from frequency-measuring transducer 1 (FIG. 1) to the input of frequency divider 2 of the transducer, employing triggers. The time intervals, whose values depend non-linearily upon the value of the parameter P being measured, are provided by divider 2. From divider 2 the pulses are transmitted to control circuit 3 which varies the division factor of divider 4. The latter divides the frequency of quartz oscillator 5 by the variable division factor which so varies in time that at the output of divider 4 the frequency, coming to fill the time interval defined by the frequency of the frequency-measuring transducer as well as by the division factor of divider 2, varies according to the law insuring linear variation of the digital information in the output counter 6 depending upon the value of parameter P to be measured.

AND circuit 7 serves for gating the pulses coming with a variable repetition rate to counter 6. The moments of opening and closing of gate (AND circuit) 7 are determined by control circuit 3.

Figure 2:
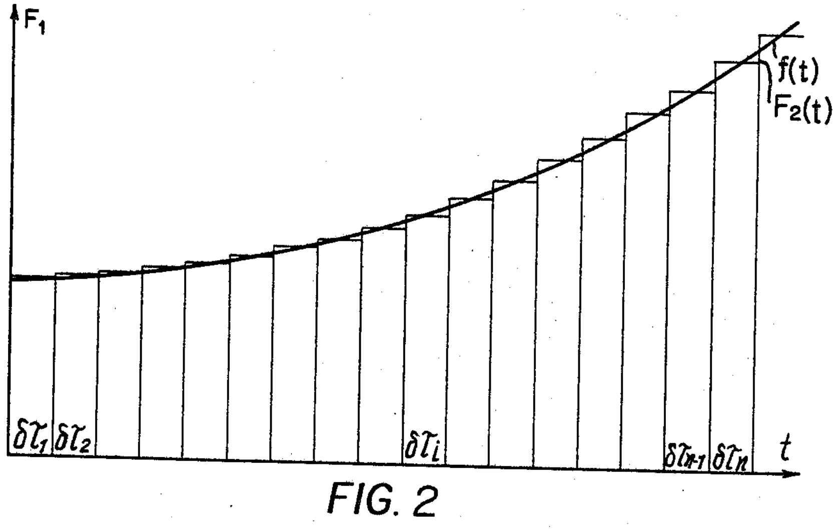
FIG. 2 is a graph showing the operation of the controllable oscillator and the conversion of the continuous frequency function into a discrete one.

Assume that for linearization of a certain characteristic of the transducer the frequency at the output of divider 4 shall correspond to the equation: $F_1=(t)$ (FIG. 2).

The technical problem of obtaining a continuous functional relationship $f(t)$ is very difficult to solve, hence the step (discrete) function $F_2(t)$ which assumes the fixed values of frequency within certain time intervals $\delta\tau i$ $(i=1, 2, \ldots, n)$ is generated at the output of divider 4 instead of continuous function $f(t)$.

Figure 3:
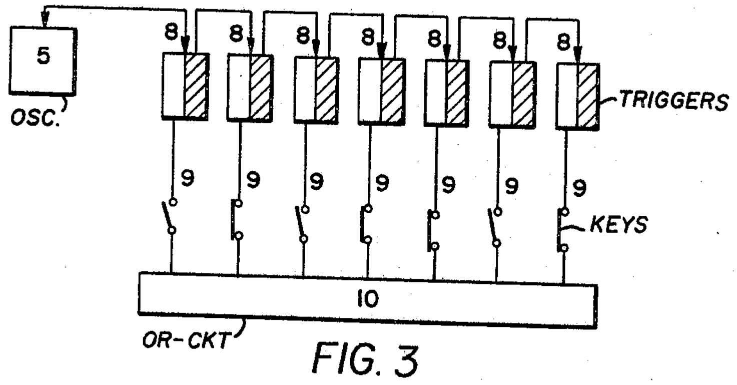
FIG. 3 is a logical circuit of the frequency divider enabling the obtaining of discrete values of the desired frequencies.
Figure 4:
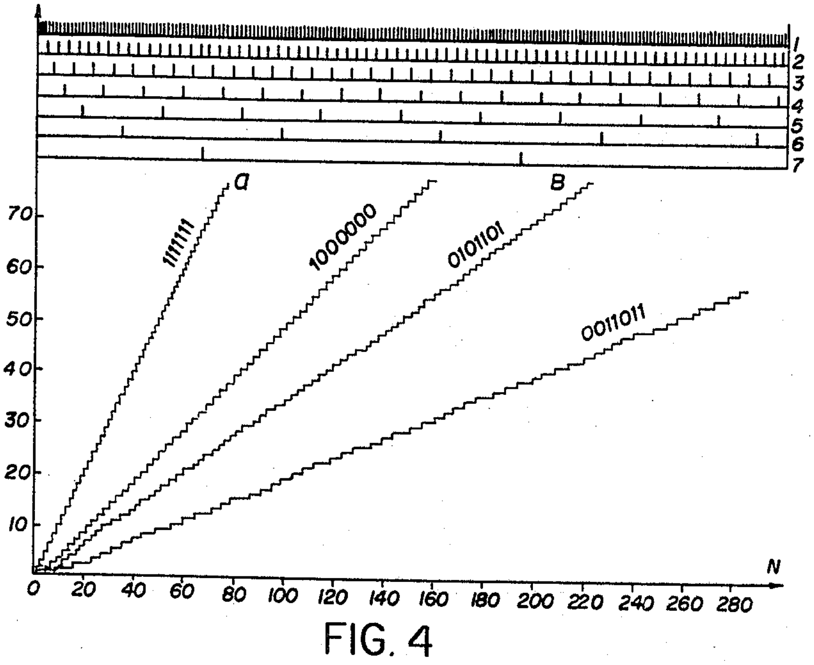
FIG. 4 shows time diagrams illustrating the process of generating discrete values of the desired frequency.
Figure 5:
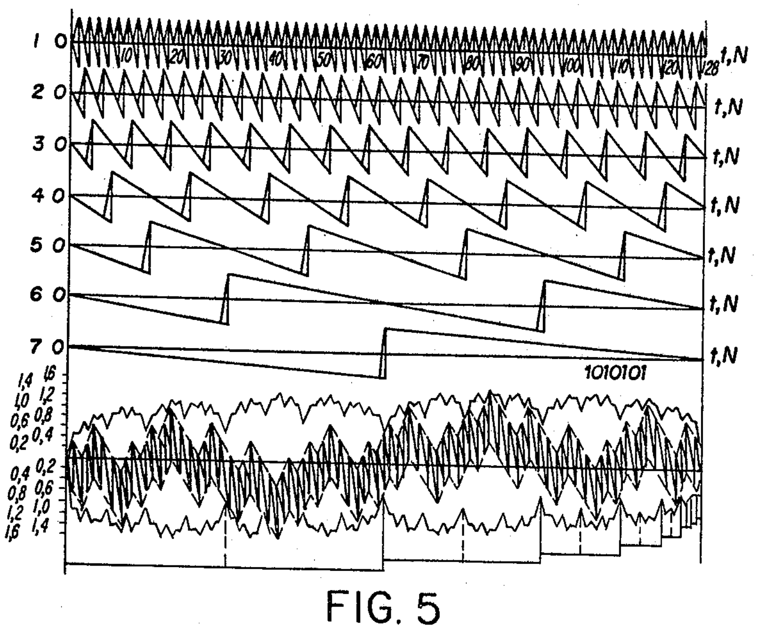
FIG. 5 shows the diagrams with an analysis of the controllable divider operation errors.

The operation of divider 4 is illustrated by FIGS. 3, 4 and 5.

For the purpose of simplification the divider in FIG. 3 is shown as a seven-digit system.

The pulses from quartz oscillator 5 pass to the chain of triggers 8 connected according to the counting circuit. From the trigger triodes opposite those of the counting circuit the pulses are transmitted through keys 9 (AND circuits) to OR circuit 10.

The upper part of FIG. 4 shows regular repetition rates of pulses taken from triggers 8 opposite to counting collectors. As is apparent from FIG. 4, the data on the pulse trains are separated in time. Hence, at the output of OR circuit 10 a pulse train will appear representing a sum of initial regular sequences of the type of $f/2$, $f/4$, $f/8$, . . . passed through keys 9. Graphically these trains are shown in FIG. 4 by the broken lines, each of the latter corresponding to a definite code conforming to the state of keys 9. For instance, when all keys 9 are closed, the frequency corresponding to the code IIIIIII (number 127, curve *a*) will appear at the output. With the keys being switched over, a frequency (curve *b*) corresponding, for instance, to code 0101101 (number 45) can be obtained, etc.

As seen from FIG. 4, the smaller the number is, the smaller the angle of inclination of the broken line is.

Mention should be made that the output pulse recurrence of OR circuit 10 is found to be irregular, i.e. there is an irregularity error.

The graphical determination of the irregularity error and of its distribution along the interval of approximation are shown in FIG. 5. Here $t$ is time, and N is the number of pulses received by triggers 8.

In the upper part of the diagram there are shown the values of errors made by each digit stage (1 through 7). The summary irregularity error can be obtained by geometrical summation of errors of the connected digit stages. In the lower part of the diagram there is shown as an example (by thick line) the variation of the summary irregularity error for code 1010101 (number 85). The thin line represents the envelope of maximum errors of all possible inclinations at seven digit stages of the divider.

Analytically, the maximum error can be determined with an accuracy up to the third decimal place from the expression:

$$\Delta_{\max.}=\frac{3n+7}{18}\cdot T_p$$

where $n$ is the number of triggers in a divider; $T_p$ is a period of the initial regular pulse train.

For $n=7$, $\Delta_{\max.}=1.555.T_p$, i.e. the error is close to the discrete value $T_p$ which may be brought to a negligibly small value.

It should be noted that said error is not integrated, and to the end of each region of approximation it has a zero value (FIG. 5). The pulse numbers of the estimated regular frequency and those of the irregular frequency obtained in the region of approximation are equal within fractions of the estimated frequency period, which may be taken into account at the successive regions of approximation.

Figure 6:
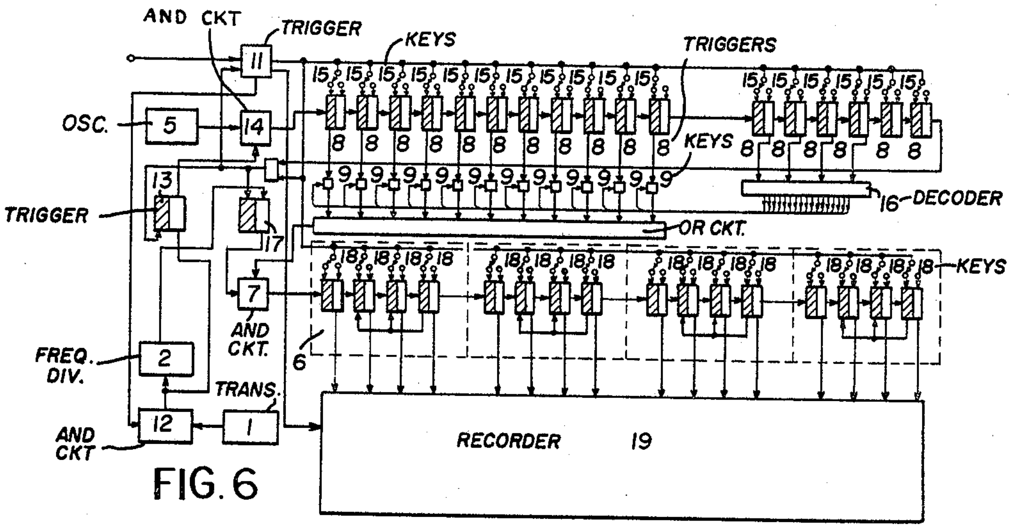
FIG. 6 is a complete logical circuit of the device insuring the linearization of the operating characteristics of the frequency-measuring transducers.

FIG. 6 is a complete logical circuit of a functional device for linearization of operating characteristics of the transducer.

Figure 7:
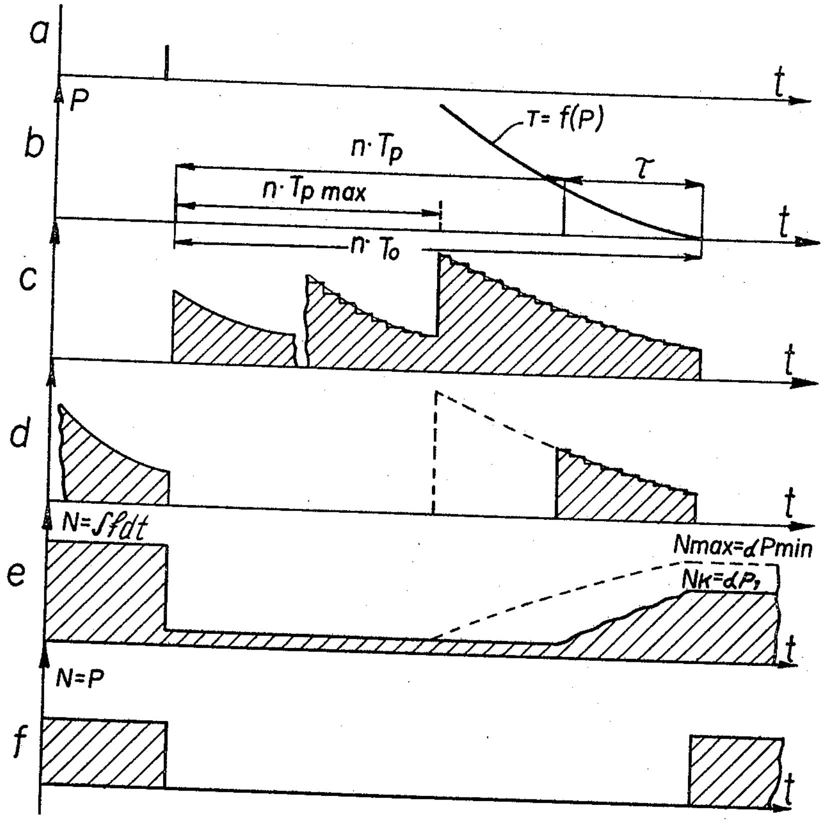

FIG. 7 shows time diagrams illustrating the operation of the device.

The actuating pulse (FIG. 7*a*) comes to trigger circuit 11 (FIG. 6) and through the latter brings all other circuits into the initial state. Further, this pulse opens gate (AND circuit) 12 of frequency-measuring transducer 1.

The first pulse from frequency-measuring transducer 1, after passing through gate (AND circuit) 12, turns over trigger 13, thereby opening gate (AND circuit) 14. The pulses of quartz oscillator 5 frequency are transmitted to the seventeen-digit chain of triggers 8. In the chain of triggers 8 by means of keys 15 such a number is preliminarily set that provided for an overflow of the counter at the moment of time $$t=n.T_0$$

where $n$ is a division factor of divider 2 of the frequency-measuring transducer;

$T_0$ is a period of oscillations of the frequency-measuring transducer at $P=0$.

The first eleven digit stages of the chain of triggers 8 are those of the counter of divider 4 and provide for 2,047 frequencies ("inclinations"). From these digit stages the signals are transmitted through keys 9 to OR circuit 10. The potentials from the 12th, 13th, 14th, 15th and the 16th triggers of the chain of triggers 8 come to decoder switch 16 which sends consecutively sixteen control potentials and can be made, for instance, as a diode matrix. By the operation of decoder 16 the whole characteristic $T=f(P)$ (FIG. 7*b*) of the frequency-measuring transducer can be separated into sixteen equal intervals (FIG. 7*c*). At the same time, during an interval, a corresponding potential from decoder 16 switches, by means of keys 9, the signals with the required regular frequencies which are united in OR circuit 10 and insure at a given interval the desired frequency of filling.

Each of the sixteen output potentials of decoder 16 passes through keys 9 to gain a corresponding frequency. In other words, from 2,047 possible frequencies only 16 estimated frequencies with the error not exceeding 0.05%, which are necessary for approximation, are selected.

After a time interval $t=n\cdot T_p$ and from the moment of opening of gate (AND circuit) 14, the pulse coming from divider 2 and carrying the information on the value of the measured parameter P (FIG. 7*b*), turns over trigger 17 which, in its turn, opens gate 7 whose input is supplied with the pulses at variable repetition rate, said rate varying discretely according to law selected by decoder 16 and insuring the linearization of the transducer characteristics.

The pulses from the output of gate 7 (FIG. 7*d*) pass to decimal counter 7 (FIG. 7*e*) provided with four decades. If necessary, a preliminary recording can be made in the decimal counter through keys 18 enabling to perform the addition or subtraction of the number corresponding to the constant value of the parameter being being measured (to perform to zero adjustment).

From decimal counter 6 (FIG. 7) the information comes to digital recorder 19.

At moment $t=n \cdot T_0$ the proposed device is restored to its initial state. The processes are further repeated automatically.

The described method makes it possible to obtain a desired digit-pulse function, as well as to obtain, after a linear conversion of the latter and a voltage, by any conventional digit-to-analog converter, any functional voltage with a high degree of accuracy.

FIG. 8 illustrates the logical circuit of the device enabling the obtaining of preset functional voltages with a high degree of accuracy.

Through trigger circuit 11 the trigger pulse brings the device into the initial state.

At the same time, trigger 13 turns over, thereby opening gate (AND circuit) 14, following which the pulses from quartz oscillator 5 are coming to the chain of triggers 8. The first elevent digit stages of the chain of triggers 8 serve to obtain the initial regular pulse trains of the type of $f/2$, $f/4$, $f/8$, . . . , $f/24$. The triggers from 12th through 16th serve to control the operation of decoder 16 generating consecutively sixteen control potentials, each of the latter "authorizing," through a corresponding key 9, the passing of the initial regular pulse trains to OR circuit 10. Each potential coming from decoder 16 defines simultaneously the region of the linear approximation of the desired function. The repetition rate of pulses at the output of OR circuit 10 determines the value of the generated derivative function ("inclination"). The sign of the derivative function in every region of approximation is determined by the switching of counter 6 reversely operating, for subtraction or addition.

The control of the reverse of counter 6 in every region of the linear approximation, as well as the value of the derivative function in the same region, is performed by each of the sixteen control potentials of decoder 16 serving as a switch.

Thus, a digit-pulse function similar to the required function of voltage can be obtained in counter 6.

The digit stages of counter 6 control the operation of the conventional digit-to-analog converter 20 wherein the digit-pulse function is converted into a functional voltage and the required functional voltage appears at the output of said converter.

Depending upon the curvature of the function being generated and upon the desired accuracy of measurements, the number of the linear approximation regions can be increased from 16 to 32, 64, etc. by making decoder 16 more complex and by increasing the number of digit stages of the counter, said number being formed by the first digit stages of the chain of triggers 8. The initial state can be set by keys 18.

While the invention has been described in its preferred embodiment, it is to be understood by those siklled in the art that alterations and modifications within the purview of the appended claims may be made without departing from the true spirit and scope of the invention in its broader aspects.

What is claimed is:

1. A device for generating a voltage representing a function, said device comprising a quartz oscillator; an AND circuit connected to the output of the quartz oscillator; a quartz oscillator frequency divider with a controllable division factor, said divider being connected to and receiving signals from said quartz oscillator; a decoder-switch connected to said frequency divider to vary the division factor thereof according to said function; a trigger which controls the operation of said AND circuit and is connected to said frequency divider; a reversible output pulse counter connected to said frequency divider; a converter for converting digital information into a corresponding analog voltage, said converter being connected to said pulse counter; and a trigger circuit actuating said trigger, frequency divider and pulse counter.

2. A device for generating a voltage representing a function, said device comprising a quartz oscillator; an AND circuit connected to the quartz oscillator; a quartz oscillator frequency divider with a controllable division factor, said divider being connected to said quartz oscillator and including AND circuits, a chain of series-connected triggers including inputs and outputs, one output of each trigger being connected to the input of the next trigger in the chain and the other output being connected to the corresponding AND circuit to provide time anticoincidence of pulses repeating at a rate $f/2^n$, where $f$ is the frequency of said quartz oscillator, $n$ is the rank of a respective one of said triggers, the latter said output also being connected to an OR circuit for summing up the pulses; a decoder-switch connected to said frequency divider to vary a division factor thereof according to said function; a trigger which controls the operation of said AND circuit and is connected to said frequency divider; a reversible output pulse counter connected to said OR circuit of said frequency divider; a converter for converting digital information into a corresponding analog voltage, said converter being connected to said pulse counter; and a trigger circuit actuating said trigger, frequency divider and the pulse counter.

3. A device for the discrete processing of information of frequency-measuring transducers, said device comprising a frequency device; a key circuit connected to said sensing device; a circuit for fixing the time of measurements, said circuit being connected to said key circuit; a quartz oscillator for filling the period of the frequency sensing devices, an OR circuit connected to said quartz oscillator; a quartz oscillator frequency divider with a controllable division factor, said divider being connected to said OR circuit; a decoder-switch including an input and output connected to said divider; a supplementary AND circuit connected to said divider; a trigger connected to said supplementary AND circuit, the latter said trigger being connected to said AND circuit for fixing the time of measurements; an output pulse counter connected to said supplementary AND circuit; means for recording the information, said means connected to said counter; and a trigger circuit actuating said divider, the counter and the means for recording the information and the key circuit.

4. A device for the discrete processing of information of frequency-measuring transducers, said device comprising a frequency device; a key circuit connected to said device; a circuit for fixing the time of measurement, said circuit being connected to said key circuit; a quartz oscillator for filling the period of the frequency device; an AND circuit connected to said quartz oscillator; a quartz oscillator frequency divider with a controllable division factor, said divider being connected to said AND circuit; a decoder-switch including an input and output connected to said divider; a supplementary AND circuit connected to OR circuit of said divider; a trigger connected to said supplementary AND circuit, the latter said triggers being connected to said AND circuit for fixing the time of measurements; an OR circuit connected to said decoder-switch and controlling said trigger; a supplementary trigger connected to said OR circuit and to said key circuit, said supplementary trigger being further connected to said AND circuit; an output pulse counter connected to said supplementary AND circuit; means to record the information connected to said counter; and a trigger circuit operating said divider, counter, means for information recording, key circuit and OR circuit.

5. A device for the discrete processing of information of frequency-measuring transducers, said device comprising a frequency device; a key circuit connected to said device; a circuit for fixing the time of measurements, said circuit being connected to said key circuit; a quart oscillator for filling the period of said frequency devices; and AND circuit connected to said quartz oscillator; a quartz oscillator frequency divider with a controllable division factor, said divider being connected to said AND circuit and including AND circuits, a chain of series-connected triggers and an OR circuit, each trigger being connected to the next trigger and to the input of the corresponding OR circuit of the divider; a supplementary AND circuit connected to said OR circuit of the divider; a decoder switch connected to said dividers; a trigger connected to said supplementary AND circuit and to said circuit for fixing the time of measurements; an OR circuit connected to said decoder-switch and operating said trigger; a supplementary trigger connected to said OR circuit and to said key circuit, and to said OR circuit; an output pulse counter connected to said supplementary OR circuit; information recording means connected to said counter; and a trigger circuit operating said divider, means for information recording, key circuit and an OR circuit.

6. A functional device for the discrete processing of information of frequency-measuring transducers, said device comprising a frequency device; a key circuit connected to said device; a circuit for fixing the time of measurements and connected to said key circuit; a quartz oscillator for filling the period of frequency devices; an AND circuit connected to said quartz oscillator; a quartz oscillator frequency divider with a controllable division factor, said divider being connected to said AND circuit and employing AND circuits, a chain of series-connected triggers and an OR circuit, each trigger being connected to the next trigger and to the corresponding AND circuit of the divider; a supplementary AND circuit connected to said OR circuit of the divider; a decoder-switch connected to divider; a trigger connected to said supplementary AND circuit and to said circuit for fixing the time of measurements; an OR circuit connected to said decoder-switch and operating said trigger; a supplementary trigger connected to said OR circuit and to the output of said key circuit, and to said AND circuit; an output pulse counter connected to said supplementary AND circuit; means for recording information including a digital recorder and connected to said counter; and a trigger circuit operating said divider, counter, digital recorder, key circuit and OR circuit.

References Cited

UNITED STATES PATENTS

| | | | |
|---|---|---|---|
| 2,921,740 | 1/1960 | Dobbins et al. | 235—197 |
| 2,951,986 | 9/1960 | Gordon | 235—150.3 XR |
| 3,085,555 | 3/1963 | Vadus et al. | 235—150.53 XR |
| 3,321,608 | 5/1967 | Sterling | 235—150.3 XR |

MALCOLM A. MORRISON, Primary Examiner

J. F. RUGGIERO, Assistant Examiner

U.S. Cl. X.R.

235—150.53